(12) United States Patent
Evans

(10) Patent No.: US 12,046,729 B2
(45) Date of Patent: Jul. 23, 2024

(54) VEHICLE STRUCTURAL MEMBER WITH BATTERY CHILLER

(71) Applicant: Ford Global Technologies, LLC, Dearborn, MI (US)

(72) Inventor: Tim Van Evans, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 457 days.

(21) Appl. No.: 16/716,607

(22) Filed: Dec. 17, 2019

(65) Prior Publication Data

US 2021/0184286 A1 Jun. 17, 2021

(51) Int. Cl.
| | |
|---|---|
| *H01M 10/625* | (2014.01) |
| *B33Y 10/00* | (2015.01) |
| *B33Y 80/00* | (2015.01) |
| *B60L 58/26* | (2019.01) |
| *B60R 16/033* | (2006.01) |
| *B62D 21/02* | (2006.01) |
| *B62D 21/09* | (2006.01) |
| *H01M 10/613* | (2014.01) |

(52) U.S. Cl.
CPC ........... *H01M 10/625* (2015.04); *B33Y 10/00* (2014.12); *B33Y 80/00* (2014.12); *B60R 16/033* (2013.01); *B62D 21/02* (2013.01); *B62D 21/09* (2013.01); *H01M 10/613* (2015.04); *B60L 58/26* (2019.02); *H01M 2220/20* (2013.01)

(58) Field of Classification Search
CPC ............. H01M 10/625; H01M 10/613; H01M 2220/20; H01M 10/6556; B33Y 10/00; B33Y 80/00; B60R 16/033; B60R 16/04; B62D 21/02; B62D 21/09; B62D 21/17; B60L 58/26; B60L 2240/545; Y02E 60/10; Y02T 10/70; Y02T 90/16
USPC ................................................ 165/80.4, 166
See application file for complete search history.

(56) References Cited

U.S. PATENT DOCUMENTS

| | | | | |
|---|---|---|---|---|
| 5,931,219 | A * | 8/1999 | Kull | F28D 9/005 |
| | | | | 165/166 |
| 6,814,133 | B2 * | 11/2004 | Yamaguchi | F28D 9/0012 |
| | | | | 165/41 |
| 7,717,164 | B2 * | 5/2010 | Richter | F28F 3/027 |
| | | | | 165/167 |
| 9,921,005 | B2 * | 3/2018 | Bluetling | F28D 9/005 |
| 9,933,215 | B2 * | 4/2018 | Ollier | F28F 9/00 |
| 9,951,998 | B2 * | 4/2018 | Bardeleben | F28F 13/12 |
| 10,107,555 | B1 * | 10/2018 | Miller | B23P 15/26 |
| 10,302,366 | B2 * | 5/2019 | Schatz-Knecht | F28F 3/08 |

(Continued)

*Primary Examiner* — Len Tran
*Assistant Examiner* — Gustavo A Hincapie Serna
(74) *Attorney, Agent, or Firm* — Burris Law, PLLC

(57) ABSTRACT

A structural support member for a vehicle includes a structural member, a battery chiller additively manufactured and disposed at least partially within the support member. The battery chiller includes a pair of spaced apart coolant chambers and a plurality of hollow pins extending between the pair of spaced apart coolant chambers such that the pair of spaced apart coolant chambers are in fluid communication with each other via the plurality of hollow pins. A refrigerant chamber can be included and be between the pair of spaced apart coolant chambers such that coolant fluid flows from one of the pair of spaced apart coolant chambers to another of the pair of spaced apart coolant chambers through the refrigerant chamber via the plurality of hollow pins.

14 Claims, 4 Drawing Sheets

(56) References Cited

U.S. PATENT DOCUMENTS

| | | | |
|---|---|---|---|
| 10,378,827 B2* | 8/2019 | Ariyama | F28D 9/0075 |
| 10,989,481 B2* | 4/2021 | Crawford | F28D 9/0093 |
| 11,014,440 B2* | 5/2021 | Glickman | B33Y 80/00 |
| 11,022,375 B2* | 6/2021 | Bucknell | F28F 1/022 |
| 11,118,842 B2* | 9/2021 | Ojiro | F28D 9/0056 |
| 11,199,369 B2* | 12/2021 | Vandermeer | F28D 9/0056 |
| 2005/0241814 A1* | 11/2005 | Hendrix | F28D 9/005 |
| | | | 165/167 |
| 2012/0325446 A1* | 12/2012 | Wakamatsu | F28D 9/0012 |
| | | | 165/167 |
| 2013/0133875 A1* | 5/2013 | Kim | F28D 9/005 |
| | | | 165/166 |
| 2013/0189556 A1* | 7/2013 | Toepfer | H01M 10/6567 |
| | | | 165/185 |
| 2014/0013787 A1* | 1/2014 | Wesner | F28D 9/005 |
| | | | 62/239 |
| 2015/0369115 A1* | 12/2015 | Kim | F28F 27/02 |
| | | | 165/103 |
| 2016/0356205 A1* | 12/2016 | Braun | F02M 35/10268 |
| 2017/0276440 A1* | 9/2017 | Kenworthy | F28F 1/32 |
| 2018/0080693 A1* | 3/2018 | Wang | H01M 10/625 |
| 2018/0266296 A1* | 9/2018 | Takemoto | F01N 13/009 |
| 2020/0014006 A1* | 1/2020 | Oliveira | H01M 50/222 |

* cited by examiner

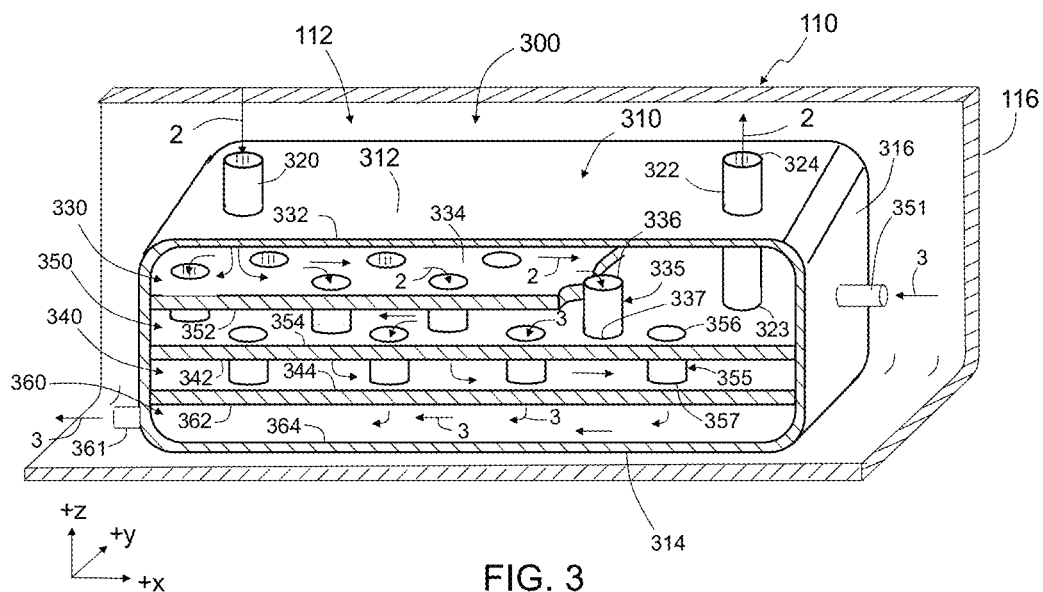
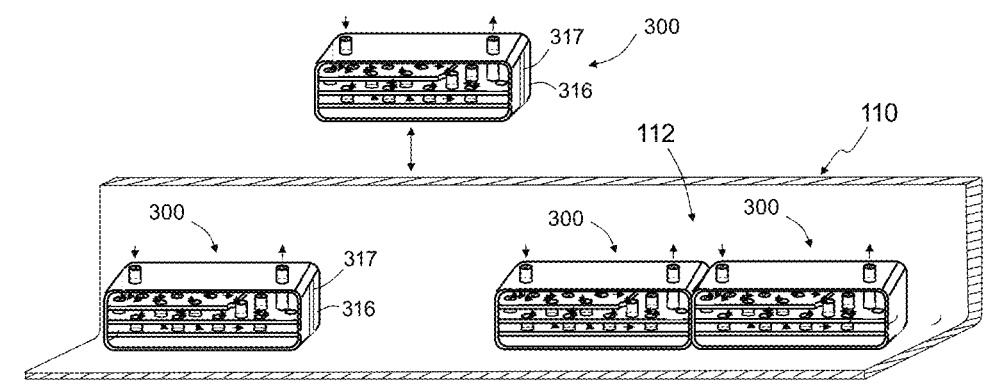
FIG. 3
FIG. 4

VEHICLE STRUCTURAL MEMBER WITH BATTERY CHILLER

FIELD

The present disclosure relates to battery chillers, and particularly to battery chillers for vehicles.

BACKGROUND

The statements in this section merely provide background information related to the present disclosure and may not constitute prior art.

Battery chillers are used in hybrid and electric vehicles to regulate the temperature of the vehicle batteries and thereby enhance vehicle performance. Such battery chillers are typically manufactured by brazing stamped aluminum or aluminum alloy plates together to form chambers for cooling fluid and refrigerant to flow through. For example, the stamped plates can have a dimple design that provides cavities for fluid to flow through and one chamber formed by a pair of adjacent stamped plates has cooling fluid that circulates and withdraws heat from the batteries and an adjacent chamber formed by a pair of adjacent stamped plates has refrigerant that withdraws heat from the cooling fluid. However, designs of such battery chillers are currently limited to brazing process capabilities and the shape and size of the dimples that can be stamped into the plates.

The present disclosure addresses the design issues of battery chillers, along with other issues related to manufacturing and packaging battery chillers in a vehicle.

SUMMARY

In one form of the present disclosure, a structural support member for a vehicle includes a structural member, a battery chiller disposed at least partially within the support member, and the battery chiller is additively manufactured at least partially within the support member. In some variations, the battery chiller includes a pair of spaced apart coolant chambers and a plurality of hollow pins extending between the pair of spaced apart coolant chambers such that the pair of spaced apart coolant chambers are in fluid communication with each other via the plurality of hollow pins. In such variations, a refrigerant chamber can be included and be between the pair of spaced apart coolant chambers such that coolant fluid flows from one of the pair of spaced apart coolant chambers to another of the pair of spaced apart coolant chambers through the refrigerant chamber via the plurality of hollow pins. In other such variations, a pair of spaced apart refrigerant chambers and another plurality of hollow pins extending between the pair of spaced apart refrigerant chambers can be included such that the pair of spaced apart refrigerant chambers are in fluid communication with each other via the another plurality of hollow pins. In at least one variation one of the pair of the spaced apart refrigerant chambers is between the pair of spaced apart coolant chambers and one of the pair of spaced apart coolant chambers is between the pair of spaced apart of refrigerant chambers.

In some variations, the battery chiller includes a stack of alternating coolant and refrigerant chambers with a plurality of hollow coolant pins extending between adjacent coolant chambers such that the adjacent coolant chambers are in fluid communication with each other via the plurality of hollow coolant pins and a plurality of hollow refrigerant pins extending between adjacent refrigerant chambers such that the adjacent refrigerant chambers are in fluid communication with each other via the plurality of hollow refrigerant pins.

In at least one variation the battery chiller is additively manufactured within a pre-existing structural member. In another variation the battery chiller and the structural member are formed together as an additive manufactured part. In such variations the structural member comprises a bottom wall and the battery chiller is additively manufactured onto the bottom wall.

In some variations, the structural member is a cross-member of a vehicle frame.

In another form of the present disclosure, a structural support member for a vehicle includes a vehicle structural member having a substructure and the substructure comprises an additive manufactured battery chiller. In some variations the battery chiller is additively manufactured within the vehicle structural member. In at least one variation the vehicle structural member includes a bottom wall and the battery chiller is additively manufactured on the bottom wall.

In some variations the battery chiller includes a top wall, a bottom wall, and a plurality of spaced apart intermediate walls between the top wall and the bottom wall. A plurality of hollow pins extend between the plurality of intermediate walls, and the plurality of spaced apart intermediate walls are in fluid communication with each other via the plurality of hollow pins.

In at least one variation, the battery chiller includes a plurality of coolant chambers and a plurality of hollow pins, the plurality of coolant chambers in fluid communication with each other via the plurality of hollow pins. In such a variation, the plurality of coolant chambers comprise a plurality of spaced apart walls with apertures, and the plurality of hollow pins are in fluid communication with the apertures from each of the plurality of spaced apart walls.

In still another form of the present disclosure, a structural support member for a vehicle is formed by a method including additive manufacturing a bottom wall, additive manufacturing a battery chiller on the bottom wall and additive manufacturing a structural member around the battery chiller such that the structural member includes the bottom wall. In some variations the battery chiller includes the bottom wall. In at least one variation the battery chiller includes a plurality of coolant chambers and a plurality of hollow pins, and the plurality of coolant chambers are in fluid communication with each other via the plurality of hollow pins. In such variations the plurality of coolant chambers include a plurality of spaced apart walls with apertures and the plurality of hollow pins are in fluid communication with the apertures from each of the plurality of walls.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a cross-sectional view of section A-A in FIG. 1 showing a structural member and a battery chiller according to another form of the present disclosure;

FIG. 4 is a cross-sectional view of section A-A in FIG. 1 showing a structural member and a battery chiller according to still another form of the present disclosure;

Figure 5:
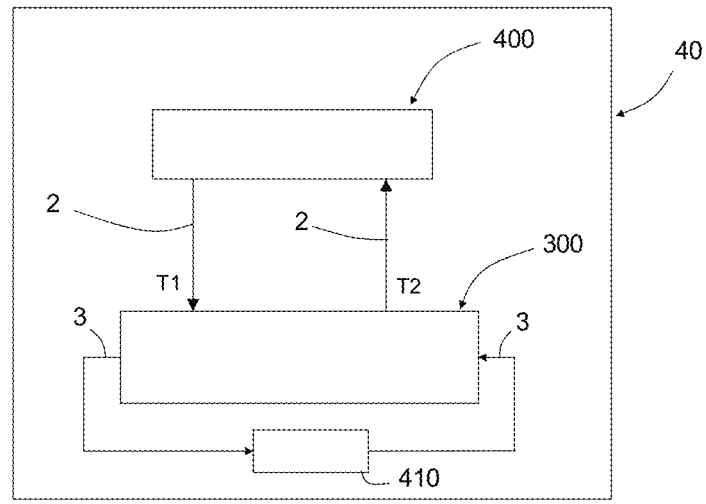
Figure 6:
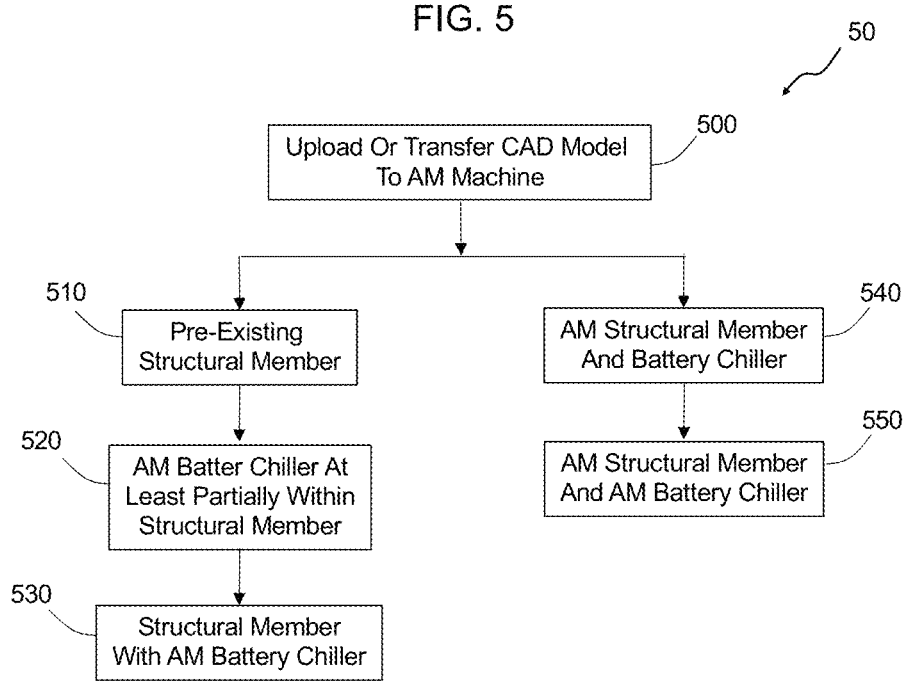

FIG. 5 schematically depicts a vehicle with a battery chiller according to the teachings of the present disclosure; and FIG. 6 is a flow chart for a method of manufacturing a structural member and a battery chiller according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
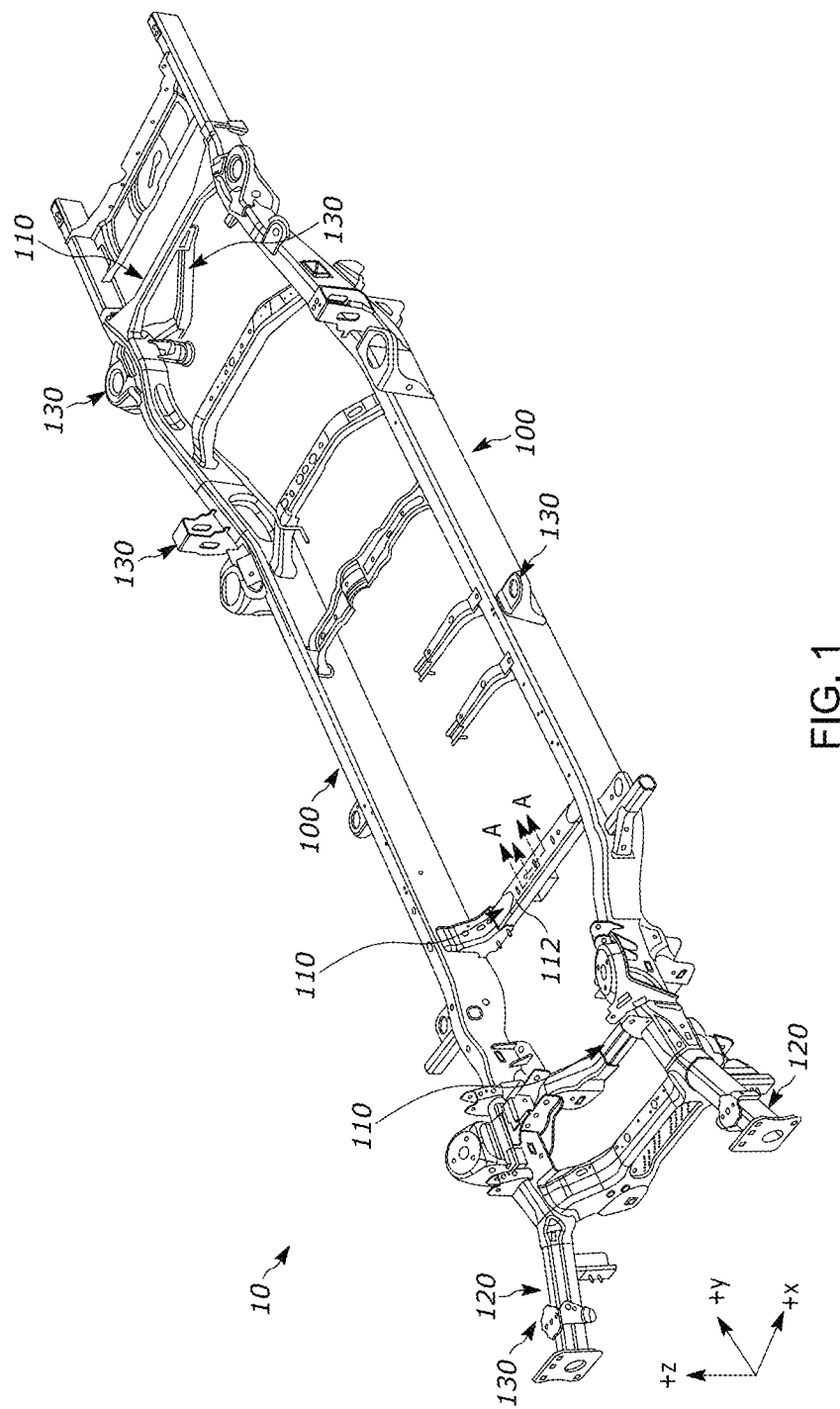
FIG. 1 is a perspective view of a vehicle frame according to the teachings of the present disclosure.

Referring to FIG. 1, a perspective view of a vehicle frame 10 according to the teachings of the present disclosure is shown. The vehicle frame 10 includes a plurality of structural support members 100, 110, 120, 130 (also referred to herein simply as "structural members"). In one form of the present disclosure, the plurality of structural members 100, 110, 120, 130 include a pair of main frame members 100 extending along a length direction (y direction) of the vehicle frame 10, a plurality of cross-members 110 extending between the pair of main frame members 100, a pair of front suspension members 120 extending from the pair of main frame members 100 along a length direction, and a plurality of brackets 130 attached to the pair of main frame members 100, plurality of cross-members 110 and/or pair of front suspension members 120. It should be understood that other structural members are included with a vehicle such as A-pillars, B-pillars, and door frames, among others, and such structural members are included within the teachings of the present disclosure.

Figure 2:
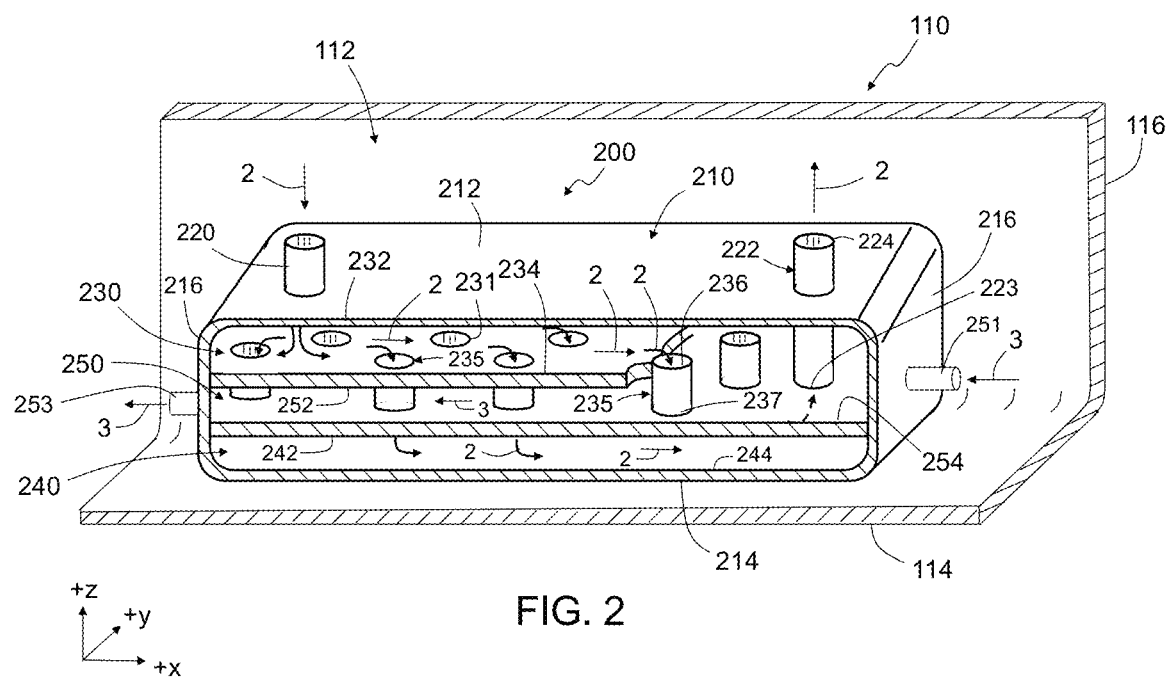
FIG. 2 is a cross-sectional view of section A-A in FIG. 1 showing a structural member and a battery chiller according to one form of the present disclosure.

Referring now to FIG. 2, a structural member of the vehicle frame includes a substructure 112 that comprises a battery chiller 200. In the example shown in FIG. 2, the battery chiller 200 is positioned within one of the cross-members 110. However, it should be understood that the cross-member 110 shown in FIG. 2 can represent any of the structural members listed above, among others. The cross-member 110 includes a top wall 112 (FIG. 1), a bottom wall 114, and a pair of side walls 116 (only one side wall 116 shown in FIG. 2). The battery chiller 200 has an enclosure 210 with a first coolant chamber 230 and a second coolant chamber 240 spaced apart from the first coolant chamber 230 (also referred to herein collectively as a "pair of spaced apart coolant chambers 230, 240").

The enclosure 210 of the battery chiller 200 has a top wall 212, a bottom wall 214, a pair of end walls 216, a pair of side walls (not shown but in the x-z plane in the figures), and a plurality of spaced apart intermediate walls 234-342 (described below) between the top wall 212 and the bottom wall 214. In some variations of the present disclosure at least one of the pair of side walls of the battery chiller 200 is formed by one of the pair side walls 116 of the cross-member 110.

For example, in at least one variation the pair of side walls of the battery chiller 200 are formed by (i.e., are the same as) the pair side walls 116 of the cross-member 110. In other variations, at least one of the pair of side walls of the battery chiller 200 is separate from an adjacent sidewall 116 of the cross-member 110. Similarly, in some variations of the present disclosure, the bottom wall 214 of the battery chiller 200 is formed by the bottom wall 114 of the cross-member 110, while in other variations, the bottom wall 214 of the battery chiller 200 is separate from the bottom wall 114 of the cross-member 110. For example, and as discussed in greater detail below, in variations of the present disclosure the cross-member 110 (and other structural members disclosed herein) and the battery chiller 200 (and other battery chillers disclosed herein) are made by additive manufacturing (also known as "3D printing") such that at least a portion of the battery chiller 200 is formed integral with the cross-member 110.

The first coolant chamber 230 includes and is bounded by a top wall 232 and a bottom wall 234, and the second coolant chamber 240 includes and is bounded by a top wall 242 and a bottom wall 244. In some variations, the top wall 232 of the first coolant chamber 230 is formed by or is the same as the top wall 212 of the enclosure 210 and the bottom wall 244 of the second coolant chamber 240 is formed by or is the same as the bottom wall 214 of the enclosure 210. In other variations, the top wall 232 of the first coolant chamber 230 is separate from the top wall 212 of the enclosure 210 and/or the bottom wall 244 of the second coolant chamber 240 is separate from the bottom wall 214 of the enclosure 210.

Extending between the first coolant chamber 230 and the second coolant chamber 240 is a plurality of hollow pins 235 (also referred to herein as hollow coolant pins"). Each of the plurality of hollow pins 235 includes a first end 236 in fluid communication with the first coolant chamber 230 and a second end 237 in fluid communication with the second coolant chamber 240. That is, the bottom wall 234 of the first coolant chamber 230 includes a plurality of first apertures 231, the top wall 242 of the second coolant chamber 240 includes a plurality of second apertures (not shown), and the first end 236 of the plurality of hollow pins 235 is in fluid communication with the plurality of first apertures 231 and the second end 237 of the plurality of hollow pins 235 is in fluid communication with the plurality of second apertures. Accordingly, the plurality of hollow pins 235 provide fluid communication between the first coolant chamber 230 and the second coolant chamber 240 such that coolant 2 flowing through an inlet 220 into the first coolant chamber 230 flows through the plurality of hollow pins 235 and into the second coolant chamber 240. Also, an outlet 222 is included with a bottom end 223 in fluid communication with the second coolant chamber 240 and a top end 224 providing fluid communication outside of the enclosure 210 such that coolant 2 flowing through the second coolant chamber 240 flows through the outlet 222 and exits the battery chiller 200.

Still referring to FIG. 2, in some variations of the present disclosure a refrigerant chamber 250 is positioned between the pair of spaced apart coolant chambers 230, 240. The refrigerant chamber 250 includes a top wall 252 and a bottom wall 254 which are in contact with the bottom wall 234 of the first coolant chamber 230 and the top wall 242 of the second coolant chamber 240, respectively. In at least one variation the top wall 252 of the refrigerant chamber 250 and the bottom wall 234 of the first coolant chamber 230 are the same wall and/or the bottom wall 254 of the refrigerant chamber 250 and the top wall 242 of the second coolant chamber 240 are the same wall. A refrigerant inlet 251 and a refrigerant outlet 253 can be included such that refrigerant 3 enters the battery chiller 200 via the refrigerant inlet 251, flows through the refrigerant chamber 250, and exits the battery chiller 200 via the refrigerant outlet 253. In the alternative, in at least one variation the inlet 220 and the outlet 222 are a double walled (not shown) such that coolant 2 flows in one direction (e.g., −z direction) through the inlet 220 and into the first coolant chamber 230 while refrigerant 3 flows from the refrigerant chamber 250 and exits the enclosure through the inlet 220 (not shown) in an opposite direction (e.g., +z direction). Similarly, coolant flows from the second coolant chamber 240 and through the outlet 222 in one direction (e.g., +z direction) and while refrigerant flows through the outlet 222 (not shown) in an opposite direction (−z direction) and into the refrigerant chamber 250. It should be understood that other inlet and outlet configurations for entry and exit of the coolant 2 and/or refrigerant 3 can be used for the battery chiller 200 and are included in the teachings of the present disclosure.

While FIG. 2 shows only one refrigerant chamber, it should be understood that more than one refrigerant chamber can be included. For example, and with reference to FIG. 3, the substructure 112 comprising a battery chiller 300 with a stack of alternating coolant chambers and alternating refrigerant chambers is shown. Particularly, the battery chiller 300 includes a first coolant chamber 330 spaced apart from a second coolant chamber 340, and a first refrigerant chamber 350 spaced apart from a second refrigerant chamber 360 such that alternating coolant chambers and refrigerant chambers (along z direction in the figures) are provided. Similar to the battery chiller 200 (FIG. 2), the battery chiller 300 is positioned within the cross-member 110 and the battery chiller 300 has an enclosure 310 with a top wall 312, a bottom wall 314, a pair of end walls 316, a pair of side walls (not shown but in the x-z plane in the figures), and a plurality of spaced apart intermediate walls 334-362 (described below) between the top wall 312 and the bottom wall 314.

In some variations of the present disclosure at least one of the pair of side walls of the battery chiller 300 is formed by one of the pair of side walls 116 of the cross-member 110. For example, in at least one variation the pair of side walls of the battery chiller 300 are formed by (i.e., are the same as) the pair of side walls 116 of the cross-member 110. In other variations, at least one of the pair of side walls of the battery chiller 300 is separate from an adjacent sidewall 116 of the cross-member 110. Similarly, in some variations of the present disclosure, the bottom wall 314 of the battery chiller 300 is formed by the bottom wall 114 of the cross-member 110, while in other variations, the bottom wall 314 of the battery chiller 300 is separate from the bottom wall 114 of the cross-member 110.

The first coolant chamber 330 includes a top wall 332 and a bottom wall 334, and the second coolant chamber 340 includes a top wall 342 and a bottom wall 344. In some variations, the top wall 332 of the first coolant chamber 330 is formed by or is the same as the top wall 312 of the enclosure 310, while in other variations the top wall 332 of the first coolant chamber 330 is separate from the top wall 312 of the enclosure 310.

Extending between the first coolant chamber 330 and the second coolant chamber 340 is a plurality of hollow coolant pins 335. Each of the plurality of hollow coolant pins 335 include a first end 336 in fluid communication with the first coolant chamber 330 and a second end 337 in fluid communication with the second coolant chamber 340. Accordingly, the plurality of hollow pins 335 provide fluid communication between the first coolant chamber 330 and the second coolant chamber 340 such that coolant 2 flowing through an inlet 320 into the first coolant chamber 330 flows through the plurality of hollow pins 335 and into the second coolant chamber 340. Also, an outlet 322 is included with a bottom end 323 in fluid communication with the second coolant chamber 340 and a top end 324 providing fluid communication outside of the enclosure 310 such that coolant 2 flowing through the second coolant chamber 340 can flow through the outlet 322 and exit the battery chiller 300.

Still referring to FIG. 3, the first refrigerant chamber 350 is positioned between the first and second coolant chambers 330, 340 and the second refrigerant chamber 360 is positioned below (−z direction) the second coolant chamber 340. The first refrigerant chamber 350 includes a top wall 352 and a bottom wall 354 which are in contact with the bottom wall 334 of the first coolant chamber 330 and the top wall 342 of the second coolant chamber 340, respectively. In some variations of the present disclosure the top wall 352 of the refrigerant chamber 350 and the bottom wall 334 of the first coolant chamber 330 are the same wall and/or the bottom wall 354 of the first refrigerant chamber 350 and the top wall 342 of the second coolant chamber 340 are the same wall.

The second refrigerant chamber 360 includes a top wall 362 and a bottom wall 364 which are in contact with the bottom wall 344 of the second coolant chamber 340 and the bottom wall 314 of the enclosure 310, respectively. In some variations of the present disclosure the top wall 362 of the second refrigerant chamber 360 and the bottom wall 344 of the second coolant chamber 340 are the same wall and/or the bottom wall 364 of the second refrigerant chamber 360 and the bottom wall 312 of enclosure 310 are the same wall.

Extending between the first refrigerant chamber 350 and the second refrigerant chamber 360 is a plurality of hollow refrigerant pins 355. Each of the plurality of hollow refrigerant pins 355 include a first end 356 in fluid communication with the first refrigerant chamber 350 and a second end 357 in fluid communication with the second refrigerant chamber 360. Accordingly, the plurality of hollow refrigerant pins 355 provide fluid communication between the first refrigerant chamber 350 and the second refrigerant chamber 360 such that refrigerant 3 flowing through an inlet 320 into the first refrigerant chamber 350 flows through the plurality of hollow pins 355 and into the second refrigerant chamber 360.

A refrigerant inlet 351 and a refrigerant outlet 361 can be included such that refrigerant 3 flows enters the battery chiller 300 via the refrigerant inlet 351, flows through the first refrigerant chamber 350, the hollow refrigerant pins 355, the second refrigerant chamber 360 and exits the battery chiller 300 via the refrigerant outlet 361. In the alternative, in at least one variation the inlet 320 and the outlet 322 are a double walled (not shown) such that coolant 2 flows in one direction (e.g., −z direction) through the inlet 320 and into the first coolant chamber 330 while refrigerant 3 flows from the first and/or second refrigerant chambers 350, 360 and exits the enclosure 310 through the inlet 320 (not shown) in an opposite direction (e.g., +z direction). Similarly, coolant 2 flows from the second coolant chamber 340 and through the outlet 322 in one direction (e.g., +z direction) while refrigerant 3 flows through the outlet 322 (not shown) in an opposite direction (−z direction) and into the first and/or second refrigerant chambers 350, 360. It should be understood that other inlet and outlet configurations for entry and exit of the coolant 2 and/or refrigerant 3 can be used with the battery chiller 300 and are included in the teachings of the present disclosure.

While FIGS. 2 and 3 show a single battery chiller 200, 300 disposed at least partially within a structural member, it should be understood that a plurality of battery chillers can be disposed at least partially within a structural member. For example, and with reference to FIG. 4, the substructure 112 comprises a plurality of battery chillers 300 disposed within the cross-member 110 is shown. Also, in some variations, one or more of the battery chillers 300, and other battery chillers disclosed herein, are included as a subunit that can be replaced as indicated in FIG. 4. For example, in some variations of the present disclosure, the battery chiller 300, and other battery chillers disclosed herein, can include one or more brackets 317 that provide for the battery chillers 300 to be attached to each other such that an additional battery chiller 300 can be added and disposed within the cross-member 110 for enhanced cooling of vehicle batteries as shown in FIG. 4. And in other variations a battery chiller 300 can be removed from the cross-member 110 as shown in FIG. 4, e.g., to be replaced with another battery chiller 300.

In operation, one or more battery chillers 300 are disposed within a structural member and a coolant inlet line (not shown) provides coolant 2 to the inlet 320. The coolant 2 flows through the inlet 320 and into the first coolant chamber 330. As shown in the FIG. 3, the coolant 2 flows from a left side (−x direction) towards a right side (+x direction) of the first coolant chamber 330. Also, the coolant 2 flows from the first coolant chamber 330, through the hollow coolant pins 335 and into the second coolant chamber 340 where it may or may not continue to flow from a left side (−x direction) towards a right side (+x direction) of the second coolant chamber 340. In some variations of the present disclosure, the coolant exits the enclosure through the outlet 322 as indicated by the upward (+z direction) arrow positioned above the outlet 322.

While coolant flows through the battery chiller 300 as described above, refrigerant 3 also flows through the battery chiller as shown in FIG. 3. Particularly, refrigerant 3 flows though the refrigerant inlet 351 and into the first refrigerant chamber 350 from a right side (+x direction) towards a left side (−x direction). Also, the refrigerant 3 flows through the hollow refrigerant pins 355 and into the second refrigerant chamber 360 where it may or may not continue to flow from the right side (+x direction) towards the left side (−x direction) of the second coolant chamber 340. In some variations of the present disclosure, the refrigerant exits the enclosure through the refrigerant outlet 361 as indicated by the arrow positioned next to the outlet 361. As shown in FIG. 3, in some variations of the present disclosure the refrigerant 3 flows in an opposite direction than coolant 2.

Referring to FIG. 5, prior to flowing into the battery chiller 300 the coolant 2 is used to remove heat from vehicle batteries 400 and the refrigerant 3 is used to remove heat from the coolant 2 as it flows through the battery chiller 300. That is, coolant 2 at a first temperature T1 flows into the battery chiller 300 and while flowing through the first and second coolant chambers 330, 340 heat from the coolant 2 is transferred to the refrigerant 3 flowing through the first and second refrigerant chambers 350, 360. Accordingly, coolant 2 exits the battery chiller 300 at a second temperature T2 less than the first temperature T1 (i.e., T2<T1) before being used again to remove heat from vehicle batteries 400. Also, the refrigerant 3 flows through a refrigerant system 410 that removes heat from the refrigerant 3 after it exits the battery chiller 300 and before it re-enters the battery chiller 300 to be used again to remove heat from coolant 2.

Referring now to FIG. 6, a method 50 of manufacturing a structural member with a battery chiller disposed at least partially within the structural member is shown. The method 50 includes uploaded or transferring a computer aided design (CAD) model of the structural member and/or battery chiller to an additive manufacturing machine at 500. In some variations, the structural member is pre-existing (i.e., already formed) and has been formed with additive manufacturing or conventional manufacturing techniques as shown at 510. In such variations a battery chiller is additively manufactured at least partially within the pre-existing structural member at 520 such that a structural member with a battery chiller disposed at least partially within the structural member is provided at 530. For example, the structural member can be in the form of a U-shaped channel and the battery chiller is additively manufactured within the U-shaped channel using a bottom wall and/or side walls of the U-shaped channel as part of the battery chiller as described above with respect to battery chillers 200, 300.

In other variations, the structural member is not pre-existing (i.e., it has not already been formed) and the structural member and the battery chiller are additively manufactured together at 540 such that an additively manufactured structural member with an additively manufactured battery chiller is provided at 550. In such variations walls or surfaces of the structural member may or may not be the same as walls or surfaces of the battery chiller. For example, forming a bottom wall of the structural member may also be forming a bottom wall of the enclosure of the battery chiller and forming the side walls of the structural member may also be forming the side walls of the battery chiller. That is, the bottom wall of the structural member is the bottom wall of the enclosure and the side walls of the structural members are the side walls of the enclosure.

It should be understood that the teachings of the present disclosure include battery chillers that have a variety of shapes to fit within a given package design. For example, battery chillers with shapes such as a circular shape, a 90 degree bend shape and an oblong shape, among others, are provided. Also, the hollow pins allow coolant and/or refrigerant to flow between coolant and/or refrigerant chambers, respectively, for additional heat transfer, and the arrangement of the hollow pins are designed (e.g., staggered) to reduce pressure drop of a coolant and/or refrigerant flowing through a battery chiller. The hollow pins also provide enhanced strength such that reduced battery chiller size and durability are provided. In some variations the hollow pins can have a variation in height (z direction) such that variations in spacing between chambers is provided. And in at least one variation wall thicknesses for enhanced heat transfer and durability are additively manufactured as a function of component stresses observed from vehicle load data. In some variations of the present disclosure brackets and/or attachment points for the battery chillers are designed and additively manufactured into the battery chiller.

Non-limiting examples of additive manufacturing techniques for manufacturing the structural members with battery chillers disclosed herein include selective laser melting (SLM), direct metal laser sintering (DMLS) and electron beam melting (EBM), among others. Non-limiting examples of materials used to make the structural members with battery chillers disclosed herein include aluminum materials such as aluminum and aluminum alloys and copper materials such as copper and copper alloys, among others. In some variations of the present disclosure a structural member and a battery chiller disposed at least partially within the structural member are made from the same material (e.g., the same aluminum alloy), while in other variations a structural member and a battery chiller disposed at least partially within the structural member are made from different materials (e.g., different aluminum alloys).

It should also be understood that the teachings of the present disclosure provide a package friendly high performance battery chiller with reduced overall weight and enhanced durability and package flexibility. For example, additive manufactured battery chillers as disclosed herein can be manufactured into an existing structural member and thereby use or take up available space that is not currently being used.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural support member for a vehicle comprising:
a structural member of a vehicle frame including a bottom wall and a side wall; and
a battery chiller disposed at least partially within the bottom wall and the side wall of the structural member, wherein the battery chiller is additively manufactured onto at least one of the bottom wall or the side wall of the structural member;
wherein the battery chiller comprises a stack of alternating coolant and refrigerant chambers with a plurality of hollow coolant pins extending between adjacent coolant chambers such that the adjacent coolant chambers are in fluid communication with each other via the plurality of hollow coolant pins and a plurality of hollow refrigerant pins extending between adjacent refrigerant chambers such that the adjacent refrigerant chambers are in fluid communication with each other via the plurality of hollow refrigerant pins,
wherein the plurality of hollow coolant pins includes at least three hollow coolant pins extending between a first coolant chamber of the coolant chambers and a second adjacent coolant chamber of the coolant chambers, at least one of the hollow coolant pins disposed away from a coolant inlet and away from a coolant outlet, and the plurality of hollow refrigerant pins includes at least three hollow refrigerant pins extending between a first refrigerant chamber of the refrigerant chambers and a second adjacent refrigerant chamber of the refrigerant chambers, at least one of the hollow refrigerant pins disposed away from a refrigerant inlet and away from a refrigerant outlet,
wherein the hollow refrigerant pins are staggered one after another from a first end of the battery chiller to a second opposing end of the battery chiller, and
wherein the hollow coolant pins are staggered one after another from the first end of the battery chiller to the second opposing end of the battery chiller.

2. The structural support member according to claim 1, wherein the battery chiller is additively manufactured within a pre-existing structural member.

3. The structural support member according to claim 1, wherein the battery chiller and the structural member are formed together as an additive manufactured part.

4. The structural support member according to claim 3, wherein the structural member comprises the bottom wall and the battery chiller is additively manufactured onto the bottom wall.

5. The structural support member according to claim 4, wherein the structural member is a cross-member of the vehicle frame.

6. A structural support member for a vehicle comprising:
a vehicle structural member having a substructure, the substructure comprising a battery chiller additively manufactured onto the substructure,
wherein the battery chiller comprises a stack of alternating coolant and refrigerant chambers with a plurality of hollow coolant pins extending between adjacent coolant chambers such that the adjacent coolant chambers are in fluid communication with each other via the plurality of hollow coolant pins and a plurality of hollow refrigerant pins extending between adjacent refrigerant chambers such that the adjacent refrigerant chambers are in fluid communication with each other via the plurality of hollow refrigerant pins,
wherein the plurality of hollow coolant pins includes at least three hollow coolant pins extending between a first coolant chamber of the coolant chambers and a second adjacent coolant chamber of the coolant chambers, at least one of the hollow coolant pins disposed away from a coolant inlet and away from a coolant outlet, and the plurality of hollow refrigerant pins includes at least three hollow refrigerant pins extending between a first refrigerant chamber of the refrigerant chambers and a second adjacent refrigerant chamber of the refrigerant chambers, at least one of the hollow refrigerant pins disposed away from a refrigerant inlet and away from a refrigerant outlet, and
wherein the hollow refrigerant pins are staggered one after another from a first end of the battery chiller to a second opposing end of the battery chiller, and
wherein the hollow coolant pins are staggered one after another from the first end of the battery chiller to the second opposing end of the battery chiller.

7. The structural support member according to claim 6, wherein the battery chiller is additively manufactured within the vehicle structural member.

8. The structural support member according to claim 6, wherein the vehicle structural member comprises a bottom wall and the battery chiller is additively manufactured on the bottom wall.

9. The structural support member according to claim 6, wherein the battery chiller comprises a top wall, a bottom wall, and a plurality of spaced apart intermediate walls between the top wall and the bottom wall, and a plurality of hollow pins extending between the plurality of intermediate walls, wherein the plurality of spaced apart intermediate walls are in fluid communication with each other via the plurality of hollow pins.

10. The structural support member according to claim 6, wherein the plurality of coolant chambers comprise a plurality of spaced apart walls with apertures and the plurality of hollow coolant pins are in fluid communication with the apertures from each of the plurality of spaced apart walls.

11. A structural support member for a vehicle formed by a method comprising:
    additive manufacturing at least a portion of a bottom wall of a structural member of a vehicle frame;
    additive manufacturing a battery chiller on the structural member; and
    additive manufacturing a side wall of the structural member of the vehicle frame around the battery chiller,
    wherein the battery chiller comprises a stack of alternating coolant and refrigerant chambers with a plurality of hollow coolant pins extending between adjacent coolant chambers such that the adjacent coolant chambers are in fluid communication with each other via the plurality of hollow coolant pins and a plurality of hollow refrigerant pins extending between adjacent refrigerant chambers such that the adjacent refrigerant chambers are in fluid communication with each other via the plurality of hollow refrigerant pins,
    wherein the plurality of hollow coolant pins includes at least three hollow coolant pins extending between a first coolant chamber of the coolant chambers and a second adjacent coolant chamber of the coolant chambers, at least one of the hollow coolant pins disposed away from a coolant inlet and away from a coolant outlet, and the plurality of hollow refrigerant pins includes at least three hollow refrigerant pins extending between a first refrigerant chamber of the refrigerant chambers and a second adjacent refrigerant chamber of the refrigerant chambers, at least one of the hollow refrigerant pins disposed away from a refrigerant inlet and away from a refrigerant outlet, and
    wherein the hollow refrigerant pins are staggered one after another from a first end of the battery chiller to a second opposing end of the battery chiller, and
    wherein the hollow coolant pins are staggered one after another from the first end of the battery chiller to the second opposing end of the battery chiller.

12. The structural support member according to claim 11, wherein the battery chiller comprises the bottom wall.

13. The structural support member according to claim 11, wherein the plurality of coolant chambers comprise a plurality of spaced apart walls with apertures and the plurality of hollow coolant pins are in fluid communication with the apertures from each of the plurality of spaced apart walls.

14. The structural support member according to claim 1, wherein the structural member is a cross beam of the vehicle frame.

* * * * *